United States Patent [19]

Lam

[11] Patent Number: 4,937,552
[45] Date of Patent: Jun. 26, 1990

[54] RESISTANCE TEMPERATURE DETECTOR

[75] Inventor: Timothy W. Lam, Austin, Tex.

[73] Assignee: Weed Instrument Company, Round Rock, Tex.

[21] Appl. No.: 169,306

[22] Filed: Mar. 17, 1988

Related U.S. Application Data

[63] Continuation of Ser. No. 845,552, Mar. 28, 1986, abandoned.

[51] Int. Cl.$^5$ .............................................. H01C 3/04
[52] U.S. Cl. ......................................... 338/25; 338/28
[58] Field of Search ...................... 338/25, 28; 29/612; 374/208, 209, 183, 185

[56] References Cited

U.S. PATENT DOCUMENTS

| 2,588,014 | 3/1952 | Knudsen | 201/63 |
| 3,237,139 | 2/1966 | Werner | 338/25 |
| 3,436,713 | 4/1969 | Noia | 338/28 |
| 3,845,443 | 10/1974 | Fisher | 338/25 |
| 4,047,436 | 9/1977 | Bernard et al. | 338/25 X |

Primary Examiner—Bruce A. Reynolds
Assistant Examiner—M. M. Lateff
Attorney, Agent, or Firm—Arnold, White & Durkee

[57] ABSTRACT

A fast time response, exposed-element resistance temperature detector suitable for use under conditions of rapid changes in temperature requiring rapid and accurate temperature readings. In addition, a resistance temperature detector in accordance with the present invention can be effective under conditions where fluid flow velocity is low and fluid pressure is also low.

25 Claims, 3 Drawing Sheets

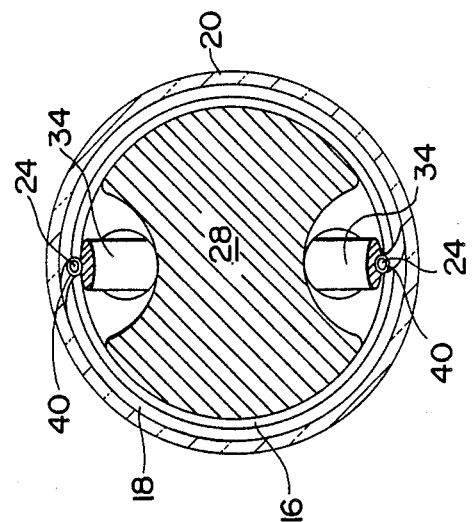

RESISTANCE TEMPERATURE DETECTOR

This application is a continuation of application Ser. No. 845,552, filed Mar. 28, 1986 now abandoned.

This invention relates to a resistance temperature detector element, to a resistance temperature detector, and to a method of making such a detector. In particular, the present invention relates to a fast time response, exposed-element resistance temperature detector suitable for use under conditions of rapid changes in temperature requiring rapid and accurate temperature readings. In addition, a resistance temperature detector in accordance with the present invention can be effective under conditions where fluid flow velocity is low and fluid pressure is also low.

The resistance temperature detector of this invention may be used for various applications where the temperature of an environment is to be sensed or measured. For example, the detector of this invention may be used for sensing the temperature of fluids such as air, gases, and liquids. The detector of this invention can have particular application as a rapid time response detector for monitoring the temperature of an environment which undergoes rapid and wide fluctuations in temperature and pressure. As such, it has particular application in wind tunnels and can be used in industrial processes and in conjunction with missiles, aircraft and the like.

In accordance with one aspect of the invention, there is provided a resistance temperature detector element comprising a substrate, a resistance wire mounted on the substrate, and a radiation reflective coating on the element, the radiation effective coating having a lower emissivity value than that of the wire.

In accordance with an alternative aspect of the invention, the invention extends to a resistance temperature detector element comprising a substrate, a resistance wire mounted on the substrate, and a radiation reflective coating on the element, the radiation reflective coating having an emissivity value which is preferably less than about 0.08 for the temperature range in which the detector is to be used.

The radiation reflective coating is preferably a coating which will not induce any significant detectable strain in the resistance wire during thermal expansion of the wire during use. The radiation reflective coating is thus such that its effect on the resistance wire will not significantly affect the accuracy of the detector element during use.

The radiation reflective coating is therefore preferably a coating which is as thin as possible so as not to induce strain in the resistance wire during use, but sufficiently thick to provide an effective radiation reflective coating.

In one embodiment of the invention, the radiation reflective coating may have a thickness of about 0.0001 inches or less. The radiation reflective coating may be of a material which is more ductile than the material of the resistance wire, which is thinner than the diameter of the resistance wire, and/or has a coefficient of expansion which is greater than that of the resistance wire.

The radiation reflective coating may be of any material which can provide effective reflection of incident radiation. In a wind tunnel, for example, the wind tunnel ducting may have a thermal time constant of several hours. Thus if there has been a long period of steady state testing at a minus 60° F., and the air temperature is changed, for example, to about 400° F., the air temperature will be at about 400° F. after about 2 minutes while the wind tunnel ducting will have remained at essentially minus 60° F. Effective radiation shielding is therefore important in providing an accurate and reliable fast response temperature detector element.

In a preferred embodiment of the invention, therefore, the radiation reflective coating may be a coating of gold, of a gold alloy, of silver, of a silver alloy, or the like. Silver has a better reflectivity than gold, that is, it has a smaller emissivity factor. Silver tends to tarnish under certain conditions, however, which changes its emissivity value and therefore limits its use.

The presently preferred coating for use in a dynamic situation where there can be a large gradient between surrounding bodies and the fluid being monitored, is a gold coating applied in a layer of about 0.0001 inches thick or less. The gold coating is preferably a coating obtained from Engelhardt Industries and known as Hanovia "Liquid Brite Gold" which is applied by means of a brush or spray and is then cured. Such a coating is generally suitable for use at temperatures up to about 1200° F.

The detector element may include a protective coating between the radiation reflective coating and the resistance wire to protect the element from the environment during use.

The protective coating is again preferably a coating which is as thin as possible so as to provide minimum induced strain in the resistance wire and so as to provide a minimum increase in mass, while at the same time providing sufficient protection for the element from the environment in which it will be used.

Where the detector element is to be used in a wind tunnel for aircraft, particularly one which simulates flight of supersonic fighter aircraft, mechanical refrigeration and turbo expanders are typically utilized to produce the low temperatures which are required at the start of a typical transient. A typical transient can, for example, start with a temperature of −40° F. at a pressure of 2 psia, and end with a temperature of about 600° F. at a pressure of 50 psia. Essentially all moisture that remains in the air after the mechanical refrigeration process is converted into small ice particles in the turbo expanders. These ice particles become entrained in the air stream and can impinge on any object in their path at speeds of up to 65 feet per second. Some of the ethylene glycol, which is often used on the evaporators to eliminate ice build-up, can also remain in the air stream. The detector element must therefore be capable of withstanding the ice and ethylene glycol particle impingement and the maximum wind loading to prevent failure.

In a presently preferred embodiment of the invention, the protective coating may comprise a ceramic material which is applied to the element by a coating process such as painting or spraying, and which is then cured. The presently preferred ceramic material is a ceramic material identified as E-Z Flow GL-611 Ceramic Glaze made by Duncan. It is preferably provided in a layer having a thickness of about 0.0005 inches.

This particular ceramic material has a coefficient of expansion which is substantially equivalent to that of a typical wire used for a detector element. The selection of a coating material having a coefficient of expansion substantially equivalent to that of resistance wire is advantageous in providing limited induced strain in the resistance wire during thermal expansion thereof.

The radiation reflective coating is preferably applied to the glazed protective coating to cover the glazed protective coating. The protective coating may also be used to electrically insulate the resistance wire.

The resistance wire may be a wire or ribbon of any material which has the property of changed resistance in response to temperature. Preferably, the material has good repeatability to thermal cycling and has long term stability. Any of the known materials may be used for this purpose.

The presently preferred material for the resistance wire is platinum. Platinum has good long term repeatability to thermal cycling, has long term stability, that is, it is stable on the response curve, and provides a good resistance curve, namely, a good resistance resolution for change of temperature. In addition, platinum can be successfully employed at a wide range of temperatures. Platinum alloys may also be useful. For lower temperature applications, nickel may for example be used.

The resistance wire may be mounted on a substrate in any convenient manner. In a preferred embodiment of the invention, the resistance wire is wound helically onto the substrate.

The substrate preferably has the same or substantially the same coefficient of expansion as the resistance wire to provide a design which is free or substantially free of strain during thermal variation. Preferably the substrate has a high yield strength to provide an appropriate ruggedness for the element when used in hostile environments such as wind tunnels or fast flowing fluids, often having entrained particles.

The substrate should also have the smallest possible outside diameter to maximize the outside heat transfer coefficient, but the wall thickness should be small to minimize the substrate mass. However, a small diameter, thin-walled tube has a small moment of inertia, thereby producing high bending stresses in hostile environments. The substrate should also be long to minimize conduction heat transfer to the resistance wire, but maximum bending stresses increase as the length squared.

A substrate which can satisfy these requirements is preferably a substrate of a platinum alloy wherein platinum is alloyed with another metal to increase the strength of the platinum substrate. In a presently preferred embodiment of the invention, where the resistance wire is platinum or a platinum alloy, the substrate is a tubular substrate of a platinum alloy. In this preferred embodiment of the invention, the substrate is preferably of a platinum alloy containing a major proportion of platinum and a minor proportion of rhodium.

The proportion of rhodium is preferably adjusted to provide the requisite strength for the tubular substrate while limiting the extent to which the coefficient of expansion of the substrate differs from that of the resistance wire. In a preferred embodiment of the invention, the substrate is made of a platinum alloy comprising about 90% platinum and about 10% rhodium. However, platinum with a range of about 5-30% rhodium, and preferably about 5-20% rhodium, could be employed.

In this preferred embodiment of the invention, the substrate can be formed as a hollow tube by drawing the alloy to provide a tube having a wall thickness of about 0.0025 inches or less, having an outer diameter of about 0.050 inches or less, and a length of about 1.1 inches. In this embodiment, a resistance wire of platinum may be wound onto the substrate, with the platinum wire having a diameter of about 0.001 inches.

By using the particular platinum-10% rhodium alloy, a substrate can be formed which has a lower mass than a corresponding ceramic substrate made by conventional techniques. In addition, a substrate can thus be created which has a coefficient of expansion substantially corresponding to that of a platinum resistance wire, and which has an adequate tensile and yield strength to provide the appropriate ruggedness for use in a wind tunnel.

Where the substrate is of an electrically conducting material, the element includes an electrical insulation material to insulate the resistance wire from the substrate. The electrical insulation is preferably in the form of an insulating coating provided on the resistance wire. The coating is again a coating which provides effective electrical insulation, but increases the mass of the element by as little as possible.

The electrical insulation material may be any coating which can provide the required electrical insulation, which will withstand the operating temperatures of the element, and which will not unduly induce strain in the resistance wire during thermal variation.

The electrical insulation is preferably a material of Type E Ceramic Coating supplied by Secon Metals of N.J. Any other available coating materials or ceramic coating materials may, however, be used to provide the requisite properties. Where such as ceramic material is used, the coating is preferably sufficiently thin so that it remains flexible and does not restrict longitudinal extension or contraction of the resistance wire during thermal variation.

The coated resistance wire may have a thickness of about 0.003 inches or less. Preferably, the coated resistance wire has a thickness of about 0.001 inches. The coating itself preferably has a thickness of 0.0001 inches or less.

The element may include an anchor member for locating the free ends of the resistance wire.

The anchor member may comprise a member which is of an electrical insulation material, which is partially received within the substrate, and which has recesses for supporting lead wires to be secured to the ends of the resistance wire.

In this embodiment of the invention, the substrate is preferably in the form of a tubular substrate, and the anchor member is partially inserted into the bore of the tubular substrate and secured in the bore.

The anchor member preferably has the recesses for the lead wires, in the form of bores into which the lead wires can be threaded. The bores preferably include securing zones, where exposed portions of lead wires located in the bores can be secured to the free ends of the resistance wire. In the preferred embodiment, the bores are sealed at their open ends by a sealant. For example, Aremco 567 Hi-Temp Adhesive may be used for this purpose.

The anchor member is preferably of a ceramic material, such as, for example, a 99.8% pure alumina.

The invention further extends to a resistance temperature detector comprising a housing and a resistance temperature detector element mounted in the housing.

The element should be thermally isolated from the housing and the housing may be formed of a material having low emissivity to further decrease error due to radiation. The housing material may also be a material having good thermal conductivity, such that heat retained by the housing will escape to the ambient condition more rapidly. A material suitably employed for these purposes is nickel.

A preferred embodiment of the invention is now described by way of example with reference to the accompanying drawings.

In the drawings:

FIG. 3 shows to an enlarged scale, a central sectional along line III—III of FIG. 2 of the resistance temperature detector element forming part of the resistance temperature detector.

Figure 1:
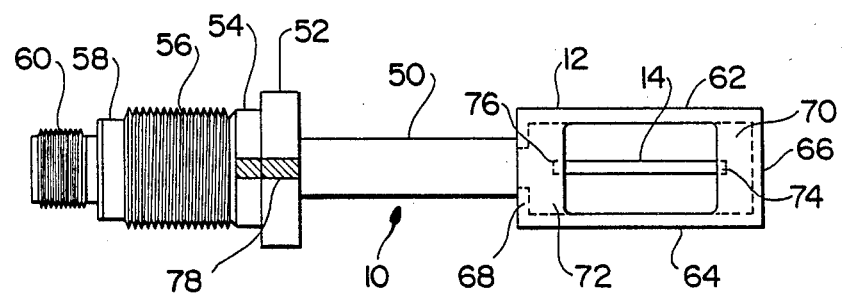
FIG. 1 shows a side elevation of a preferred embodiment of a resistance temperature detector.

With reference to the drawings, reference numeral 10 refers generally to a resistance temperature detector (commonly referred to as an RTD) for use in monitoring the air temperature in a wind tunnel appropriate for testing supersonic fighter aircraft engines.

The RTD comprises a housing 12 wherein a resistance temperature detector element 14 is mounted.

As shown in FIG. 1, housing 12 includes walls 62, 64, 66, and 68 in the end portion which retains element 14. Element 14 has ends 74 and 76 retained by pads of a thermally insulating material generally referenced as 70 and 72. Housing 12 further includes shank 50, and mounting adaptations referred to as mounting rims 52, 54, and 58, radial alignment slot 78, and threaded sections 56 and 60.

Walls 62, 64, 66 and 68 are spaced such that element 14 is exposed directly to ambient conditions, thus facilitating a fast and accurate response time. Preferably, walls 62, 64, 66, and 68 are made to minimize the overall mass of the end portion of the housing 12, but are strong enough to withstand the particular ambient conditions in which the RTD is to be used. In the preferred embodiment, the housing 12 should be strong enough for use in wind tunnel applications where wind loads of up to 100 feet per second would be encountered at a pressure of 14.7 psia.

Element 14 has end portions 74 and 76 retained in a thermally insulating material. Again, it is desired that the size of end portions 74 and 76 be minimized to expose the greatest amount of element 14 to ambient conditions. However, portions 74 and 76 should be sufficiently large to retain element 14 securely in place for a particular RTD application.

Thermally insulating material, generally referenced by numerals 70 and 72, is used to prevent error caused by thermal conduction from the housing 12 to the element 14. The thermally insulating material can take the form of pads or the like, or can be set in place and formed to a suitable thickness. It has been found that Cotronics "Thermeez" ceramic putty is particularly effective for this purpose, having a thermal conductivity of one hundred times less than the sensor itself. Preferably the putty is formed around the element 14, cured, and then sealed on its exposed surfaces to prevent infiltration of moisture. An effective sealant is Aremco 567 Hi-Temp Adhesive, which is preferably applied in a coating not exceeding 0.001 inches and then cured.

Shank 50 is preferably a narrow tube to minimize stem conduction error due to thermal conduction from a mounting bracket used for mounting the housing on a mounting surface. Shank 50 should be strong enough to withstand use conditions, but preferably is as narrow as possible to minimize stem conduction error.

Housing 12 is preferably formed of a material having low emissivity to decrease error due to radiation by surrounding objects. The housing material should also be of a material having good thermal conductivity, so that heat retained by the housing will escape to the ambient condition more rapidly. It is therefore advantageous to fast and accurate temperature measurement that housing 12 respond as quickly as possible to temperature changes. A material preferably employed for the housing material is nickel.

Mounting adaptions 52, 54, 56, 58, 60, and 78 are not particularly critical, and any suitable mounting procedure, if desired, may be employed to attach housing 12 or element 14 to a particular object.

Figure 2:
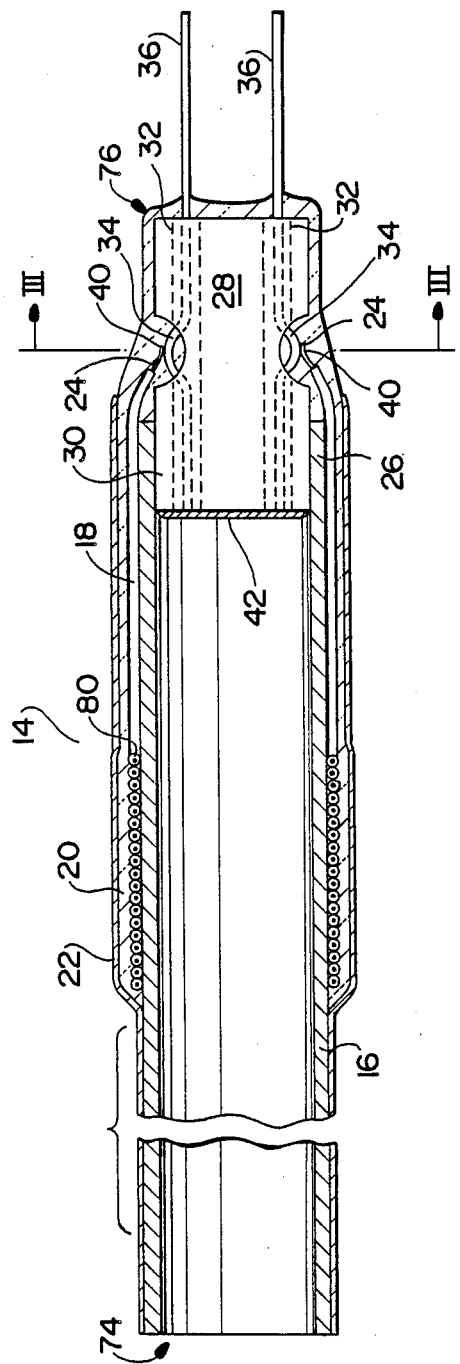
FIG. 2 shows to an enlarged scale, a fragmentary, sectional side elevation of a resistance temperature detector element forming part of the resistance temperature detector of FIG. 1.

The resistance temperature detector element 14 is illustrated in detail in FIG. 2 of the drawings.

With particular reference to FIG. 2 of the drawings, the element 14 comprises a tubular substrate 16 which is in the form of a thin walled tube formed out of a platinum alloy comprising 90% platinum and 10% rhodium.

The tubular substrate 16 has a length of 1.1 inches, a wall thickness of about 0.0025 inches, and an outer diameter of about 0.05 inches.

The element 14 further comprises a resistance wire 18 which is wound onto the tubular substrate 16.

The resistance wire 18 is a platinum wire which provides an accurate and reliable resistance response to temperature variation. The platinum resistance wire 18 as used in the preferred embodiment has a diameter of about 0.001 inches.

The resistance wire 18 is coated with an electrically insulating material comprising a ceramic coating 80. The resistance wire 18 and the ceramic coating 80 may have a thickness of about 0.003 inches or less, preferably about 0.001 inches. Preferably, the coating itself has a thickness of about 0.0001 inches or less. Ceramic coating 80 has a coefficient of expansion substantially similar to that of the resistance wire 18 and is sufficiently flexible to induce no significant strain in the resistance wire 18 during thermal variation.

The element 14 further includes a glaze coating 20 which is coated over the element 14 to protect the element during use in a hostile environment such as the wind tunnel discussed.

The glaze coating 20 comprises a thin coating of thickness of about 0.0005 inches or less. The glaze coating preferably covers all the resistance wire 18 and anchor member 28.

Glaze coating 20 in the preferred embodiment is Duncan E-Z Flow GL-611 Ceramic Glaze. The glaze coating is applied with a paint brush and then cured at a temperature no higher than 1900° F.

The element 14 further includes a radiation reflective coating 22 which is provided on the outer surface of the element 14 to reduce error resulting from radiation effects.

The radiation reflective coating 22 is preferably a thin coating of gold which has a low emissivity value, and which is sufficiently ductile so that it will not induce undue strain in the resistance wire 18 during thermal variations.

The gold coating 22 is particularly advantageous where the RTD is used in an environment where there is a large temperature difference between the fluid being monitored and the walls defining the vessel wherein the fluid is contained, as in a wind tunnel of the type described.

In the preferred embodiment, the gold coating 20 is comprised of Hanovia "Liquid Brite Gold" applied as thinly as possible with a brush. The gold coating is gradually cured in increasing temperatures not to exceed 1200° F.

The resistance wire 18 has free ends 24 which terminate at a mounting end 26 of the tubular substrate 16.

The element 14 includes an anchor member 28 which locates the free ends 24 of the resistance wire 18.

The anchor member 28 comprises a tubular member of ceramic material, preferably 99.8% pure alumina.

The anchor member has a plug portion 30 which is located within the mounting end 26 of the tubular substrate 16 by means of an appropriate adhesive. For example, Aremco 567 Hi-Temp adhesive is effective for this purpose.

The anchor member 28 has recesses in the form of bores 32 into which the leading ends 34 of lead wires 36 are threaded. Bores 32 are preferably sealed by use of a sealant 42, for example Aremco 567 Hi-Temp adhesive can be employed for this purpose.

The anchor member 28 further includes notches 38 where the exposed portions 34 of the lead wires 36 are secured to the free ends 24 of resistance wire 18 by spot welding at 40.

FIG. 3 is a sectional view of anchor member 28 showing the points of attachment of leading ends 34 of lead wires 36 to free ends 24 of resistance wire 18. In the preferred embodiment, leading ends 34 and free ends 24 are spot welded together at 40.

In preparing the element 14, the resistance wire 18 may be trimmed before or after annealing of the wire, to give a required resistance at a predetermined temperature. Preferably, resistance wire 18 will be trimmed to give a resistance of 100 ohms (±0.2 ohms) at 0° C. for the preferred application of this embodiment.

SUMMARY OF PERFORMANCE CHARACTERISTICS FOR THE RTD OF THE PREFERRED EMBODIMENT

An RTD according to the present invention was constructed to meet certain design criteria. The primary design challenges were meeting the performance requirements of time response in low air velocity flow conditions, accuracy in extreme dynamic thermal conditions and reliability in hostile environments.

1. Response Time

It was desired that an RTD of the present invention have a time constant no greater than four seconds in air under the following extreme conditions:
(a) Pressure 2 psia
(b) Temperature: −60° F.
(c) Velocity: 6 ft/sec An approximate mathematical model was developed to estimate the time constant and is given as:

$$Tau = (rho)cV/hA_s$$

Where
Tau = time constant
(rho) = density of material
c = specific heat capacity of the material
V = volume of the material
h = heat transfer coefficient
$A_s$ = surface area of material In order to meet the above response requirement and the strength requirement to withstand shock, vibration, and high air velocity, it was found that a platinum 10% rhodium tubing with an outer diameter of 0.050 inches, a wall thickness of 0.0025 inches and a length of 1.1 inches should be used as the substrate. These are the optimized dimensions which are based on the mathematical model used. The equation yields a theoretical response time of 3.93 seconds.

Laboratory test were conducted by an independent testing facility which indicate an actual time constant of 4.6 seconds. The actual time constant is about 15% off from the theoretical value due to the combination of the slight inexactness of the mathematical model which did not include unsteady state heat conduction effects at element supports and the use of some approximate thermal property values in the calculations.

The time constant test result was found to be reasonably predictable and very satisfactory. Also due to the simplicity and effectiveness of the approach used, the same approach can be used to optimize the time constants of similar designs.

2. Accuracy

It was desired that an RTD of the present invention have a conduction error no greater than 5° F. under the following extreme conditions:
(a) Pressure: 2 psia
(b) Mounting Temperature: +300° F.
(c) Velocity: 6 ft/sec
(d) Fluid Temperature: −60° F. to +650° F.

A conservative mathematical model was developed which consists of a long, thin rod, connected to a heated base, which is transferring heat to a surrounding fluid. Based on mathematical calculation, it can be estimated that temperatures distribution for such a model is given by:

$$\frac{theta}{theta_o} = \frac{\cosh m(l-x)}{\cosh ml}$$

where
theta = Temperature difference between ambient and final temperature
$theta_o$ = Temperature difference between mounting and ambient
l = length of rod
x = location along the rod
h = heat transfer coefficient
c = specific heat capacity
k = thermal conductivity
Ac = cross-sectional area $$m = \left[\frac{hc}{kA_c}\right]^{\frac{1}{2}}$$

By examining and manipulating all the parameters, such as specific heat capacities and thermal conductivities of different materials, as well as their associate dimensions, it was determined that by using a thermal insulation with a thermal conductivity 100 times less than the sensing element material, along with the design dimensions as given, the conduction error can be minimized to 4.5° F. under the given extreme environment conditions.

Again, since the relationship among all the variables affecting the conduction effect are known, the same mathematical model can be used to estimate stem conduction error of similar designs. Also it should be noted that the thermal conductivity of the thermal insulation is the key parameter to control the stem conduction error as well as improving the accuracy in estimating the time constant.

The radiation error for the RTD was desired to not exceed 15° F. under the following conditions
(a) Pressure: 2 psia
(b) Temperature: 650° F.
(c) Velocity of air flow: 6 ft/sec
(d) Where the sensor sees a single, equivalent, gray surface with a total hemispheric emissivity of 0.6 at an effective temperature of 194° F.

An energy balance equation can be formulated for the radiation heat exchange between the sensor and the gray enclosure and the convective heat exchange between the sensor and the fluid. It is assumed that the gray enclosure area is significantly much larger than the sensor surface and the formulation is given by:

$$E_r = T_g - T_1 = \frac{E_1 S}{h}(T_1^4 - T_2^4)$$

Where
$E_r$ = Radiation Error
$T_g$ = Temperature of fluid
$T_1$ = Temperature of sensor
$T_2$ = Temperature of Enclosure
h = heat transfer coefficient
$E_1$ = Emissivity of sensor
S = Stefan-Boltzmann Constant It is clear from this equation that if the surface of the sensor does not have a very low emissivity value, the sensor reading can be grossly erroneous because both $T_1$ and $T_2$ are to the fourth order power in the equation.

Gold coating was chosen here because its emissivity value is nearly the lowest and best among most radiation reflective materials. Also gold is the most suitable material for the temperature range for which the particular RTD was designed. In this particular case, an emissivity value of 0.05 was chosen and the conservatively estimated radiation error under the aforementioned conditions is 14.5° F. If other larger emissivity values are used, for example 0.1, a radiation error greater than 30° F. could be produced.

It was further desired that the reliability of the sensor shall meet the following conditions with at least a factor of safety of 4.
(a) Pressure = 120 psia
(b) Temperature = 38° F.
(c) Air Velocity = 60 ft/sec
(d) Dynamic Pressure = 0 to, 0.3 psia By utilizing the simple relationship of drag force induced by the air flow and the bending stress the drag force induced on the sensing element, which is generally the weakest point in the RTD, it was determined that using the specified element dimensions and the specified element material, the factor of safety is approximately 9.35. If pure platinum is used instead of the stronger platinum-rhodium alloy, the factor of safety could be reduced below 4.

Based on the results of the test data, it was found that an RTD constructed according to the preferred embodiment of the present invention can perform satisfactorily under the extreme conditions of applications such as use in a wind tunnel.

What is claimed is:

1. A resistance temperature detector element comprising:
   a substrate;
   a resistance wire mounted on said substrate, the resistance wire having an electrically insulating coating thereof and having a coefficient of thermal expansion substantially similar to that of the substrate; and
   a radiation reflective coating on the element, said radiation reflective coating having a lower emissivity value than that of the insulated resistance wire and a coefficient of thermal expansion such that it will not induce significant stress in the resistance wire during thermal variation.

2. An element according to claim 1, wherein the radiation reflective coating has a thickness of about 0.0001 inches and an emissivity value less than about 0.08 over the temperature range in which the element is to be used.

3. An element according to claim 1, wherein the radiation reflective coating is a gold or gold-alloy coating.

4. An element according to claim 1, wherein the radiation reflective coating is a silver or silver-alloy coating.

5. An element according to claim 1, further comprising an electrically insulating glaze coating substantially covering the element, the radiation reflective coating being provided on the surface of the glaze coating.

6. An element according to claim 5, wherein the glaze coating is a ceramic material.

7. An element according to claim 5, wherein the glaze coating has a coefficient of expansion substantially similar to that of the resistance wire.

8. An element according to claim 5, wherein the glaze coating has a thickness of about 0.0005 inches.

9. An element according to claim 1, wherein the resistance wire is a platinum wire and wherein the substrate is tubular and is composed of a platinum alloy.

10. An element according to claim 9 wherein the substrate comprises a major portion of platinum alloyed with a minor portion of another metal to increase the strength of the platinum.

11. An element according to claim 10, wherein the substrate comprises an alloy of platinum and between about 5 and about 30% by weight of rhodium.

12. An element according to claim 10, wherein the substrate comprises an alloy of platinum containing about 10% by weight of rhodium.

13. An element according to claim 1, wherein the resistance wire is mounted on the substrate by being helically wound onto the substrate.

14. An element according to claim 1, wherein the electrically insulating coating is a ceramic material.

15. An element according to claim 14, wherein the coated resistance wire has a diameter less than 0.003 inches.

16. An element according to claim 14, wherein the coated resistance wire has a diameter of about 0.001 inches.

17. An element according to claim 12 wherein the substrate is tubular and has an outer diameter of about 0.10 inches or less and a wall thickness of about 0.005 inches or less.

18. An element according to claim 12, wherein the substrate is tubular and has an outer diameter of about 0.050 inches and a wall-thickness of about 0.0025 inches.

19. An element according to claim 1, in which the substrate is tubular, and which further comprises an anchor member for locating the free ends of the resistance wire, the anchor member being partially disposed within said substrate and having recesses for receiving lead wires to be secured to the free ends of the resistance wire.

20. An element according to claim 19, in which the recesses are in the form of bores into which lead wires can be threaded and in which the anchor member has notches where the resistance wire can be secured to lead wires.

21. An element according to claim 20, having lead wires located in the bores, the lead wires being secured to the ends of the resistance wire.

22. An element according to claim 19, in which the anchor member is of an electrically insulating ceramic material.

23. A resistance temperature detector comprising:
 (a) a resistance temperature detector element comprising a substrate and a resistance wire mounted on the substrate; and
 (b) a housing formed of a material having low emissivity and high thermal conductivity wherein the resistance temperature detector element is mounted, the housing having a pair of laterally spaced locating walls wherein opposed ends of the element are supported by means of thermal insulating pads, the locating walls being laterally spaced to expos- the element directly to the environment of the detector.

24. A detector according to claim 23, in which the insulating pads are sealed to prevent moisture infiltration.

25. A detector according to claim 23, wherein said housing is formed of nickel or an alloy of nickel.

* * * * *

UNITED STATES PATENT AND TRADEMARK OFFICE
CERTIFICATE OF CORRECTION

PATENT NO. : 4,937,552

DATED : June 26, 1990

INVENTOR(S) : Timothy W. Lam

It is certified that error appears in the above-identified patent and that said Letters Patent is hereby corrected as shown below:

In claim 1, line 9, column 10, delete --thereof-- and insert "thereon".

In claim 10, line 44, column 10, insert "," after --9--; line 45, column 10, delete --portion-- and insert "proportion"; line 45, column 10, delete --portion-- and insert "proportion".

In claim 14, line 58, column 10, delete --a--.

In claim 23, line 15, column 12, delete --expos--- and insert "expose".

Signed and Sealed this

Sixteenth Day of June, 1992

Attest:

DOUGLAS B. COMER

Attesting Officer

Acting Commissioner of Patents and Trademarks